US008965897B2

(12) United States Patent
Carbonell et al.

(10) Patent No.: US 8,965,897 B2
(45) Date of Patent: Feb. 24, 2015

(54) INTELLIGENT PRODUCT FEEDBACK ANALYTICS TOOL

(75) Inventors: Lee A. Carbonell, Flower Mound, TX (US); Tsz Simon Cheng, Grand Prairie, TX (US); Jeffrey L. Edgington, Keller, TX (US); Pandian Mariadoss, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 13/407,885

(22) Filed: Feb. 29, 2012

(65) Prior Publication Data

US 2013/0226925 A1   Aug. 29, 2013

(51) Int. Cl.
*G06F 17/30*   (2006.01)

(52) U.S. Cl.
CPC ............................. *G06F 17/30719* (2013.01)
USPC ........................................................ 707/740

(58) Field of Classification Search
USPC ........................................................ 707/740
See application file for complete search history.

(56) References Cited

U.S. PATENT DOCUMENTS

| | | | |
|---|---|---|---|
| 7,930,302 B2 | 4/2011 | Bandaru et al. | |
| 8,315,895 B1* | 11/2012 | Kilat et al. | 705/7.11 |
| 2005/0065811 A1* | 3/2005 | Chu et al. | 705/1 |
| 2008/0115057 A1* | 5/2008 | Grandhi et al. | 715/272 |
| 2008/0133488 A1* | 6/2008 | Bandaru et al. | 707/3 |
| 2009/0150920 A1* | 6/2009 | Jones | 725/23 |
| 2010/0306123 A1 | 12/2010 | Cai et al. | |
| 2011/0078157 A1 | 3/2011 | Sun et al. | |
| 2011/0208522 A1* | 8/2011 | Pereg et al. | 704/235 |
| 2012/0100825 A1* | 4/2012 | Sherman et al. | 455/404.2 |
| 2013/0066716 A1* | 3/2013 | Chen et al. | 705/14.49 |

OTHER PUBLICATIONS

Lu et al., Rated aspect summarization of short comments, 2009.*
Hu et al., Fraud detection in online consumer reviews, 2011.*
Anonymous, "A method of Visually Analyzing and Comparing Complex Opinions", IP.com, Jun. 7, 2010.
Anonymous, "A System for Extracting and Analysing Tags and Sentiment Scores from Unstructured Text", IP.com, Mar. 15, 2011.

* cited by examiner

*Primary Examiner* — Mariela Reyes
*Assistant Examiner* — William Spieler
(74) *Attorney, Agent, or Firm* — Patents on Demand P.A.; Brian K. Buchheit; Scott M. Garrett

(57) ABSTRACT

A method for improving the usability of product feedback data can begin with the receipt of product feedback search parameters by an intelligent product feedback analytics tool. The product feedback search parameters can represent a product or a group of products. Product feedback search results having a rating value and/or textual feedback content can be obtained for the product feedback search parameters. For each product in the search results, a composite rating value can be synthesized from the rating values contained in the search results. For each product in the search results, the product feedback search results can be analyzed for analytic parameters using natural language processing techniques. An analytic parameter can represent a commonality within a subset of the search results. The product feedback search results, composite rating values, and analytic parameters can be presented within a user interface, providing context for the composite rating value.

20 Claims, 5 Drawing Sheets

INTELLIGENT PRODUCT FEEDBACK ANALYTICS TOOL

BACKGROUND

The present invention relates to the field of data analysis and, more particularly, to an intelligent product feedback analytics tool.

The Internet contains an overwhelming amount of information. In particular, the Internet has allowed for the collecting and sharing of reviews and feedback about a wide variety of products and services from actual product users. Such information allows potential buyers of a product or service to evaluate others' experiences prior to purchase and provide insight on the products and/or services that they use.

Unfortunately, the first problem for a user attempting to research a product or service is the sheer amount of product feedback information returned by search engines. The user is forced to ascertain the usefulness and validity of this plethora of information, which is another daunting and time-consuming task. For example, the user may have to do further research to determine any biases of a third-party review.

Typically, product feedback information includes a rating scale for the product or service, which poses another problem to the user. Not all rating scales used by different feedback sources are the same. The user is left to figure out how the four-star-based rating system used by the product's manufacturer's Web site equivocates to the five-star-based rating system used by an independent review Web site. Again, this is an arduous and time-consuming process.

However, even after investing all this time and energy, it is still easy for the user to select the wrong product or service to fit their need. This selection problem stems from a disconnect between the provided rating and the reviewer's actual feedback (i.e., the included text explaining their rating of the product). That is, a reviewer could give a product a "poor" or "bad" product rating (e.g., one star out of five) because they are trying to use the product outside the purview of its intended use or because they are including non-product criteria, such as delivery or shipping problems, in the rating.

BRIEF SUMMARY

One aspect of the present invention can include a method for improving the usability of product feedback data. Such a method can begin with the receipt of product feedback search parameters by an intelligent product feedback analytics tool. The product feedback search parameters can pertain to a product or a group of products. Product feedback search results applicable to the product feedback search parameters can be obtained. Each product feedback search result can include a rating value upon a rating scale and/or feedback content in a textual format. For each product represented in the product feedback search results, a composite rating value can be synthesized for each rating category of the rating scale defined for the intelligent product feedback analytics tool from the rating values contained in the product feedback search results that are applicable to the product. For each product represented in the product feedback search results, the product feedback search results can be analyzed for analytic parameters that represent commonalities within a subset of the product feedback search results applicable to the product. Such analysis can utilize natural language processing techniques. The product feedback search results, composite rating values, and analytic parameters can then be presented in an organized manner within a user interface. The presented analytic parameters can provide a context for the corresponding composite rating value.

Another aspect of the present invention can include a system for improving the usability of product feedback data. Such a system can include product feedback data sources, user-selected product feedback search parameters, a content aggregator, and an intelligent product feedback analytics tool. The product feedback data sources can be configured to collect and maintain product feedback data comprised of a rating value upon a rating scale and/or feedback content in a textual format. The user-selected product feedback search parameters can pertain to a product or a group of products having product feedback data stored by at least one product feedback data source. The content aggregator can be configured to collect product feedback data from the product feedback data sources that are applicable to the user-selected product feedback search parameters into a set of product feedback search results. The intelligent product feedback analytics tool can be configured to analyze the set of product feedback search results collected by the content aggregator to identify commonalities shared by distinct subsets of the product feedback search results as analytic parameters. The subsets can be based upon a product and/or a rating category of the rating scale defined for the intelligent product feedback analytics tool.

Yet another aspect of the present invention can include a computer program product that includes a computer readable storage medium having embedded computer usable program code. The computer usable program code can be configured to receive a product feedback search parameters that pertain to a product or a group of products. The computer usable program code can be configured to obtain product feedback search results applicable to the product feedback search parameters. Each product feedback search result can be comprised of a rating value upon a rating scale and/or feedback content in a textual format. The computer usable program code can be configured to, for each product represented in the obtained product feedback search results, synthesize a composite rating value for each rating category of a predefined rating scale from rating values contained in the product feedback search results that are applicable to the product. The computer usable program code can be configured to, for each product represented in the obtained product feedback search results, analyze the product feedback search results for analytic parameters that represent commonalities within a subset of the product feedback search results that are applicable to the product. This analysis can utilize natural language processing techniques. The computer usable program code can then be configured to present the product feedback search results, composite rating values, and analytic parameters in an organized manner within a user interface. The presented analytic parameters can provide a context for the corresponding composite rating value.

DETAILED DESCRIPTION

Figure 1:
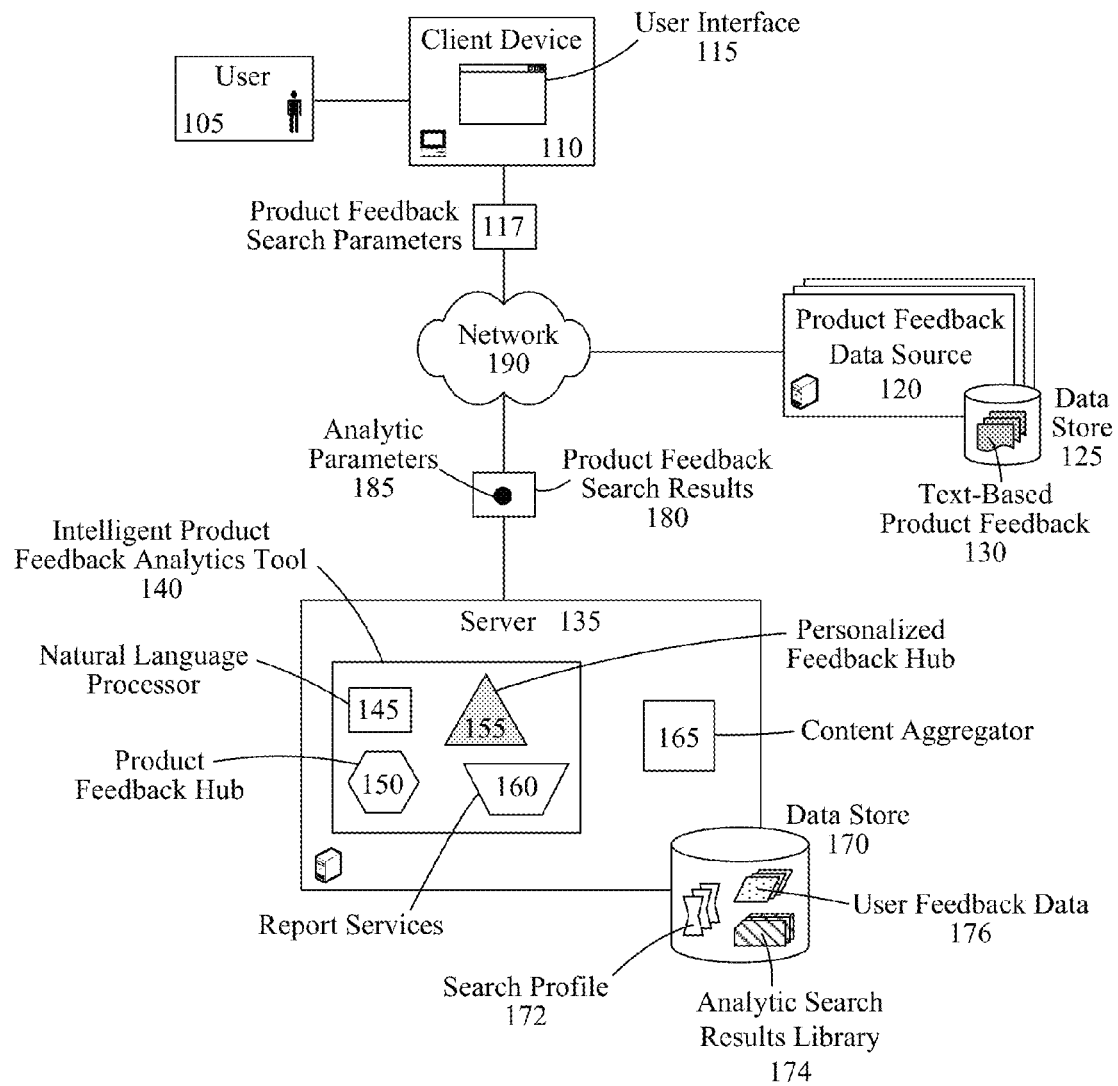
FIG. 1 is a schematic diagram illustrating a system that utilizes an intelligent product feedback analytics tool to provide a user with product feedback search results having analytic parameters in accordance with embodiments of the inventive arrangements disclosed herein.

The present invention discloses an intelligent product feedback analytics tool for improving the usability of product feedback data. The intelligent product feedback analytics tool can utilize a content aggregator to gather product feedback search results from various data sources for a set of product feedback search parameters. Natural language processing techniques can be used upon the product feedback search results to identify analytic parameters or commonalities shared by subsets of the product feedback search results. The intelligent product feedback analytics tool can also be configured to synthesize composite rating values from rating data contained in the product feedback search results. The product feedback search results, composite rating values, and analytic parameters can be presented within a user interface. The analytic parameters can provide a context and/or reason for the composite rating of a product's feedback.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 that utilizes an intelligent product feedback analytics tool 140 to provide a user 105 with product feedback search results 180 having analytic parameters 185 in accordance with embodiments of the inventive arrangements disclosed herein. In system 100, the user 105 can enter product feedback search parameters 117 for use by the intelligent product feedback analytics tool 140, herein referred to as the intelligent feedback tool 140, via a user interface 115.

The user interface 115 can be a graphical means for collecting the product feedback search parameters 117 and presenting the product feedback search results 180 with analytic parameters 185 to the user 105. The user interface 115 can be written to operate commensurately with the configuration of the client device 110 (i.e., an application written specifically for a smart phone). The client device 110 can represent a variety of computing devices capable of supporting operation of the user interface 115 and communicating with the intelligent feedback tool 140 over a network 190.

The product feedback search parameters 117 can correspond to a variety of user-selectable and/or enterable data items that define the specifics that the user 105 expects the product feedback search results 180 to pertain. The product feedback search parameters 117 can be presented to the user 105 within the user interface 115 in various ways and can include a combination of entry formats as supported by the user interface 115 and/or intelligent feedback tool 140.

For example, the product feedback search parameters 117 can be one or more text keywords. In a more robust example, the product feedback search parameters 117 can be represented by an image of a brand logo in addition to keywords.

It should be noted that the acceptance of complex product feedback search parameters 117 can require corresponding modifications to the intelligent feedback tool 140 to accommodate processing of the complex product feedback search parameters 117.

Access to the intelligent feedback tool 140 can be provided using a variety of architectures. For example, in one contemplated embodiment, the intelligent feedback tool 140 can be provided as a paid service. This service can be subscribed to by the user 105 or can be licensed by a product feedback data source 120 that provides the user 105 with access.

The intelligent feedback tool 140 can be a software system configured to synthesize analytic parameters 185 for the product feedback search results 180 that pertain to the received product feedback search parameters 117. Unlike a search engine, the intelligent feedback tool 140 can analyze the text-based product feedback 130 that comprises the product feedback search results 180 to find additional commonalities, not just the occurrence of the product feedback search parameters 117.

For example, a search engine can return hundreds of results for a model of a specific product. These results can span multiple sources and can be of differing types (e.g., white paper, advertisement, review, product information, etc.); any inter-connection between the results is unknown. The same search performed with the intelligent feedback tool 140 can provide the user 105 with results limited to product feedback (i.e., the product feedback search results 180) and highlights the words and/or phrases that the results have in common, the analytic parameters 185.

The intelligent feedback tool 140 can operate from a server 135 capable of communicating with one or more product feedback data sources 120 over a network 190. The server 135 can be the hardware and/or software required to support operation of the intelligent feedback tool 140 and a content aggregator 165.

The content aggregator 165 can be a software application used by the intelligent feedback tool 140 to gather the text-based product feedback 130 from the product feedback data sources 120 that is applicable to the product feedback search parameters 117. That is, the content aggregator 165 can be thought of as providing the intelligent feedback tool 140 with search engine functionality; the content aggregator 165 can search the text-based product feedback 130 of the product feedback data sources 120 and return those text-based product feedback 130 that are applicable to the product feedback search parameters 117 to the intelligent feedback tool 140 as product feedback search results 180.

As shown in system 100, the content aggregator 165 can be implemented separate to the intelligent feedback tool 140. This can illustrate how the intelligent feedback tool 140 can be added to an existing data system having a component that fulfills the role and functionality of the content aggregator 165. It is also possible that the content aggregator 165 can service other software systems and/or applications in addition to the intelligent feedback tool 140.

In another embodiment, the content aggregator 165 can be integrated into or bundled with the intelligent feedback tool 140. In yet another embodiment, the content aggregator 165 can reside on a separate server than the intelligent feedback tool 140, exchanging data communications over the network 190.

The product feedback data sources 120 can represent a variety of computing systems and/or software applications that collect text-based product feedback 130 from users 105. Examples of product feedback data sources 120 can include, but are not limited to, social network product pages, communal discussion sites (e.g., notice boards, forums), manufacturer Web sites, third-party review Web sites (e.g., Consumer Reports), government data systems/Web sites (e.g., FDA, NTSB, etc.), and the like.

The text-based product feedback 130 collected by a product feedback data source 120 can represent the feedback submitted by a user 105 or other entity in a textual format. The text-based product feedback 130 can reside in one or more data stores 125 associated with the product feedback data sources 120.

It should be noted that feedback collected by the product feedback data source 120 in a non-textual format (e.g., audio, video, or image) can require translation to a textual format in order to be used by the intelligent feedback tool 140.

The intelligent feedback tool 140 can include a natural language processor 145, a product feedback hub 150, a personalized feedback hub 155, a report services component 160, and a data store 170 containing search profiles 172, an analytic search results library 174, and user feedback data 176. A search profile 172 can represent stored user 105 preferences that affect operation of the intelligent feedback tool 140 and/or presentation of the product feedback search results 180.

For example, the search profile 172 can indicate a specific set of product feedback data sources 120 that a user 105 prefers to use, instead of all possible product feedback data sources 120.

The natural language processor 145 can be a software system and/or application configured to perform natural language processing functions upon the text-based product feedback 130 returned as product feedback search results 180 by the content aggregator 165 for the purpose of identifying analytic parameters 185. Examples of functions that can be performed by the natural language processor 145 can include, but are not limited to, parsing the text-based product feedback 130, relationship extraction, sentiment analysis, topic segmentation, natural language understanding, and the like.

Since most text-based product feedback 130 is typically static (i.e., isn't modified once submitted), product feedback search results 180 processed by the natural language processor 145 can be stored within the analytic search results library 174 in data store 170. As such, the time required to perform future searches for a similar product can be reduced, since a portion of the product feedback search results 180 have already been processed by the natural language processor 145.

Product feedback search results 180 from more dynamic product feedback data sources 120 that are processed by the natural language processor 145 can also be stored in the analytic search results library 174. However, additional handling can be required prior to use to determine if the source text-based product feedback 130 has been modified.

The product feedback hub 150 can embody the primary functionalities of the intelligent feedback tool 140. Functions provided by the product feedback hub 150 can include, but are not limited to, passing received product feedback search parameters 117 to the content aggregator 165, maintaining the analytic search results library 174, aggregating product feedback search results 180 by analytic parameters 185, synthesizing an overall rating for the products, supporting user interface 115 presentation functions (i.e., filter results), providing product compatibility information and/or suggestions, and the like.

The personalized feedback hub 155 can be configured to perform operations that support user-specific elements. The personalized feedback hub 155 can allow the user 105 to maintain their search profile 172 and provide user feedback data 176 for a product or group of products.

The personalized feedback hub 155 can also allow the user 105 to share their search profile 172 and/or user feedback data 176 with other users 105 via social networking systems and/or electronic communication systems. For example, the user 105 can recommend a certain set of product feedback data sources 120 by sharing their search profile 172 with their FACEBOOK friends.

The report services component 160 can be configured leverage the detailed information provided by the intelligent feedback tool 140 to generate a variety of reports for use by commercial users 105, such as product retailers and manufacturers. The reports offered by the report services component 160 can be statically or dynamically generated, depending upon implementation.

For example, a manufacturer 105 can use the report services component 160 to identify how often received negative text-based product feedback 130 is due to shipping issues (i.e., damage upon delivery or delays). Such information can help the manufacturer 105 determine if a change in retailer or shipping company is warranted.

Network 190 can include any hardware/software/and firmware necessary to convey data encoded within carrier waves. Data can be contained within analog or digital signals and conveyed though data or voice channels. Network 190 can include local components and data pathways necessary for communications to be exchanged among computing device components and between integrated device components and peripheral devices. Network 190 can also include network equipment, such as routers, data lines, hubs, and intermediary servers which together form a data network, such as the Internet. Network 190 can also include circuit-based communication components and mobile communication components, such as telephony switches, modems, cellular communication towers, and the like. Network 190 can include line based and/or wireless communication pathways.

As used herein, presented data stores 125 and 170 can be a physical or virtual storage space configured to store digital information. Data stores 125 and 170 can be physically implemented within any type of hardware including, but not limited to, a magnetic disk, an optical disk, a semiconductor memory, a digitally encoded plastic memory, a holographic memory, or any other recording medium. Data stores 125 and 170 can be a stand-alone storage unit as well as a storage unit formed from a plurality of physical devices. Additionally, information can be stored within data stores 125 and 170 in a variety of manners. For example, information can be stored within a database structure or can be stored within one or more files of a file storage system, where each file may or may not be indexed for information searching purposes. Further, data stores 125 and/or 170 can utilize one or more encryption mechanisms to protect stored information from unauthorized access.

Figure 2:
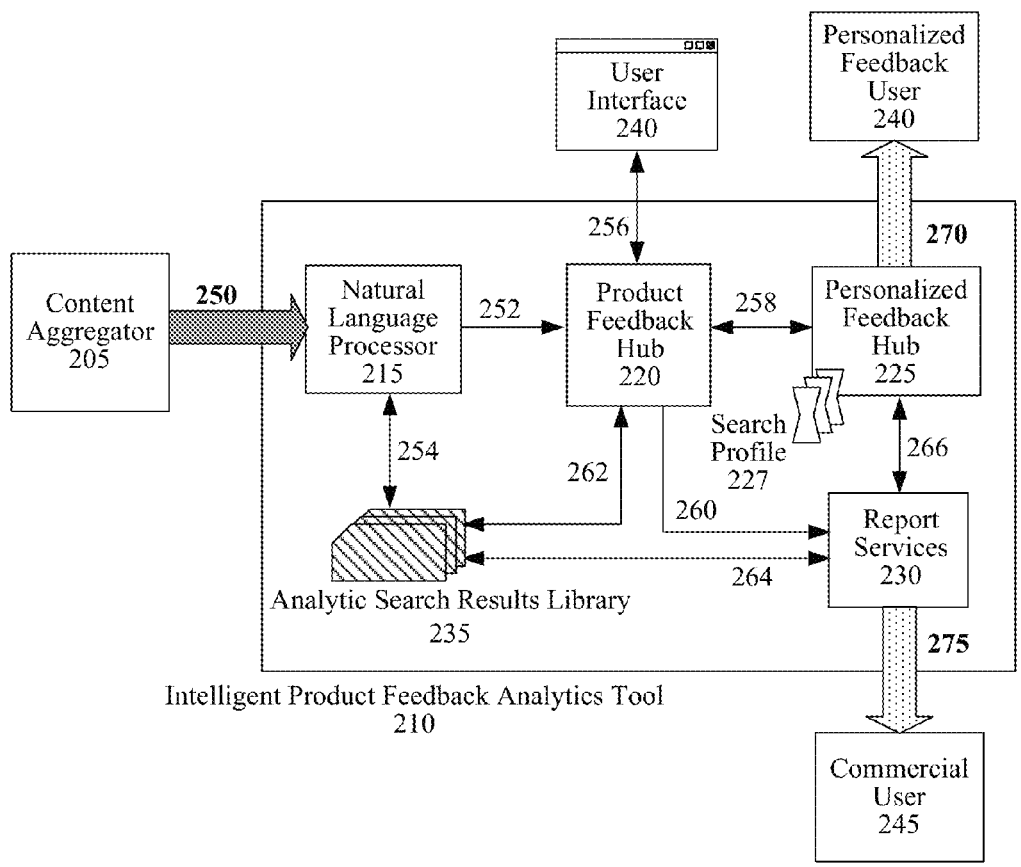
FIG. 2 is a process flow diagram describing the interaction between the components of the intelligent product feedback analytics tool in accordance with an embodiment of the inventive arrangements disclosed herein.

FIG. 2 is a process flow diagram 200 describing the interaction between the components of the intelligent product feedback analytics tool 210 in accordance with embodiments of the inventive arrangements disclosed herein. The interactions of process flow diagram 200 can be performed within the context of system 100.

In process flow diagram 200, it can be assumed that the intelligent feedback tool 210 has already received product feedback search parameters from a user, and that those product feedback search parameters have been sent to the content aggregator 205. Therefore, the interactions of process flow diagram 200 can begin with the intelligent feedback tool 210 receiving 250 its input, the product feedback search results, from the content aggregator 205.

The natural language processor 215 can be the component of the intelligent feedback tool 210 that receives the product feedback search results from the content aggregator 205. Once processing of the product feedback search results is finished, the natural language processor 215 can store 254 the processed items in the analytic search results library 235 and/or passed 252 to the product feedback hub 220.

The product feedback hub 220 can interact with the analytic search results library 235, user interface 240, personalized feedback hub 225, and report services component 230. The product feedback hub 220 can access 262 the analytic search results library 235 in order to perform various maintenance actions upon the stored data items.

The product feedback hub 220 can present 256 the product feedback search results in the user interface 240 as well as receive additional commands via the user interface 240. The product feedback hub 220 can communicate 258 with the personalized feedback hub 225 to apply user preferences from a search profile 227 to the output 270 presented to a personalized feedback user 240, a typical human user.

The personalized feedback hub 225 can utilize the data received from the product feedback hub 220 and search profiles 227 as well as request 266 applicable reports from the report services component 230 to generate the output 270 presented to the personalized feedback user 240.

The product feedback hub 220 can also invoke 260 the report services component 230 for the purpose of providing output 275 to a commercial user 245. The report services component 230 can retrieve 264 the necessary data items from the analytic search results library 235 and request 266 search profile 227 data from the personalized feedback hub 225 to generate the output 275 sent to the commercial user 245.

It should be noted that the interactions shown in process flow diagram 200 can emphasize the data handling for the two distinct user audiences. That is, although the components of the intelligent feedback tool 210 are fairly inter-connected, only a personalized feedback user 240 can directly receive output 270 from the personalized feedback hub 225 and only a commercial user 245 can receive output 275 from the report services component 230.

Figure 3:
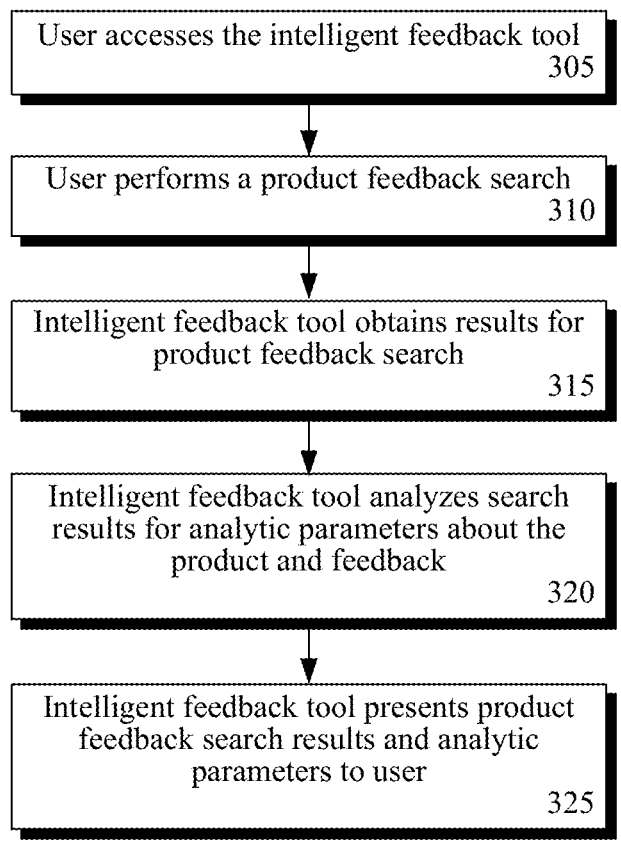
FIG. 3 is a flowchart of a method discussing, at a high-level, the use of the intelligent feedback tool in accordance with an embodiment of the inventive arrangements disclosed herein.

FIG. 3 is a flowchart of a method 300 discussing, at a high-level, the use of the intelligent feedback tool in accordance with embodiments of the inventive arrangements disclosed herein. Method 300 can perform actions described in process flow diagram 200 and/or can be performed within the context of system 100.

Method 300 can begin in step 305 where the user can access the intelligent feedback tool. Step 305 can require the user to enter authorization information. Access to the intelligent feedback tool, in step 305, can be provided by a third-party system (i.e., the intelligent feedback tool can be a widget component of a Web interface for an e-commerce Web site).

The user can then perform a product feedback search in step 310. In step 315, the intelligent feedback tool can obtain results for the product feedback search. The results for the product feedback search can be obtained from the content aggregator and/or the analytic search results library.

The intelligent feedback tool can then analyze the search results for analytic parameters about the product and/or feedback in step 320. In step 325, the intelligent feedback tool can present the product feedback search results and analytic parameters to the user.

Figure 4:
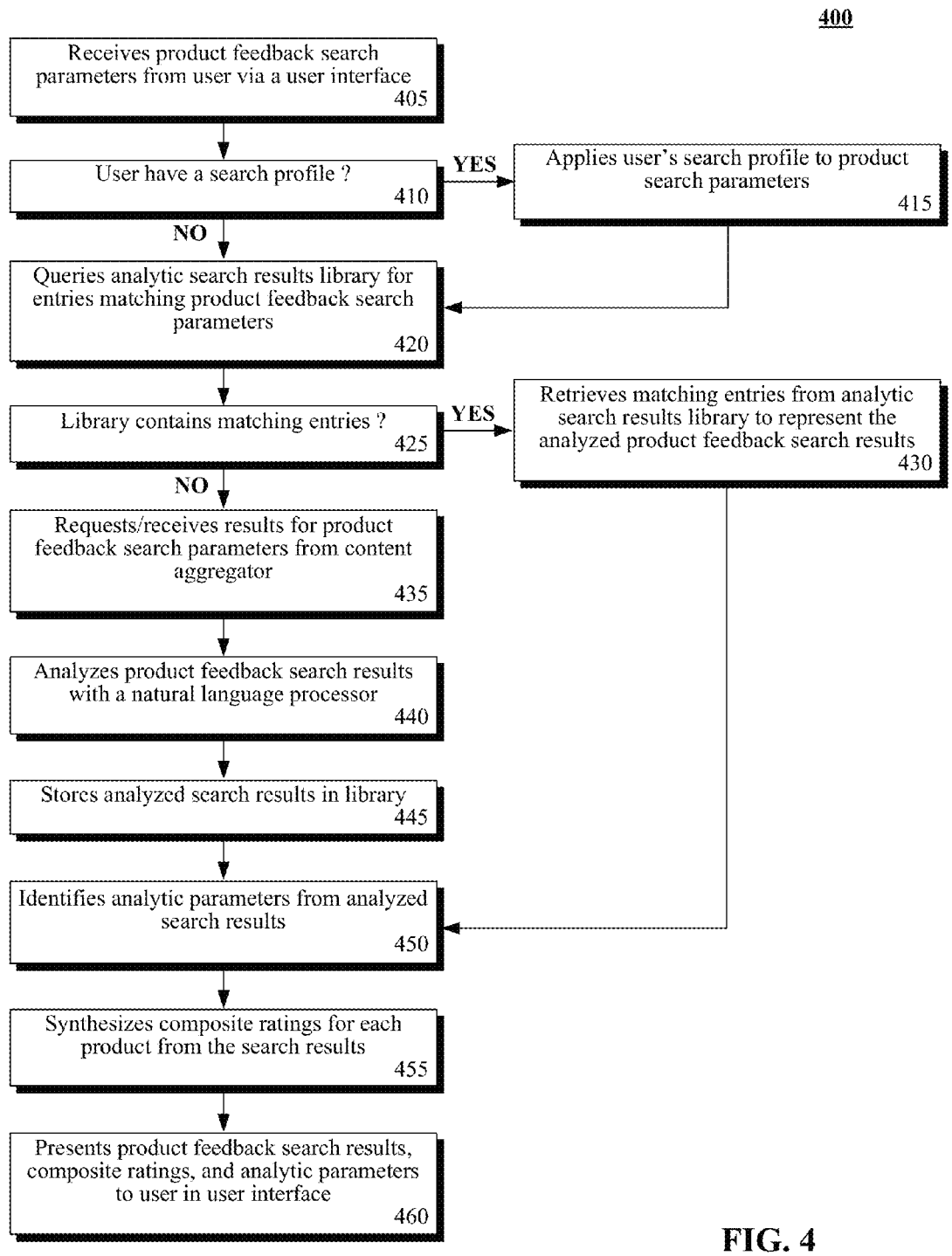
FIG. 4 is a flowchart of a method detailing operation of the intelligent feedback tool in accordance with embodiments of the inventive arrangements disclosed herein.

FIG. 4 is a flowchart of a method 400 detailing operation of the intelligent feedback tool in accordance with embodiments of the inventive arrangements disclosed herein. Method 400 can perform actions described in process flow diagram 200 and/or can be performed within the context of system 100 as well as in conjunction with method 300.

Method 400 can begin in step 405 where the intelligent feedback tool can receive product feedback search parameters from the user via a user interface. The user interface can be a stand-alone user interface or can be a sub-component (i.e., widget) of another user interface.

It can be determined in step 410 if the user has a stored search profile. When the user has an existing search profile, step 415 can execute where the applicable contents of the user's search profile are applied to the product feedback search parameters.

When the user does not have a search profile or upon completion of step 415, the analytic search results library can be queried for entries matching the product feedback search parameters in step 420. In step 425, it can be determined if the analytic search results library contains matching entries.

When the analytic search results library does contain matching entries, step 430 can be performed where the matching entries can be retrieved from the analytic search results library. The retrieved entries can be used to represent the analyzed product feedback search results to be used in the next step, step 450.

It should be noted that the steps of method 400 can represent a simplistic example of the logic used by the intelligent feedback tool. In this simplistic example, the existence of matching entries in the analytic search results library indicates that the product feedback data sources need to be queried, and absence means querying is unnecessary. However, the steps of method 400 can be expanded upon to handle situations where the existence of matching entries in the analytic search results library still requires retrieving additional product feedback data from the data sources without departing from the spirit of the present disclosure.

When the analytic search results library does not contain matching entries for the product feedback search parameters, the intelligent feedback tool can request and receive results for the product feedback search parameters from the content aggregator in step 435. In step 440, the product feedback search results provided by the content aggregator can be analyzed using the natural language processor.

The analyzed product feedback search results can then be stored in the analytic search results library in step 445. In step 450, analytic parameters can be identified from the analyzed product feedback search results.

Composite ratings can be synthesized for each product contained in the product feedback search results in step 455. Step 455 can represent the equivocation and resolution of the disparate rating systems used by the various product feedback data sources. A variety of statistical and semantic analysis techniques can be used when performing step 455.

In step 460, the product feedback search results, composite ratings, and analytic parameters can then be presented to the user in the user interface.

Again, it should be emphasized that this is a simplistic example and that the presentation of the product feedback search results in step 455 can also be influenced by the contents of the user's search profile (i.e., contains a preferred layout for the product feedback search results).

Figure 5:
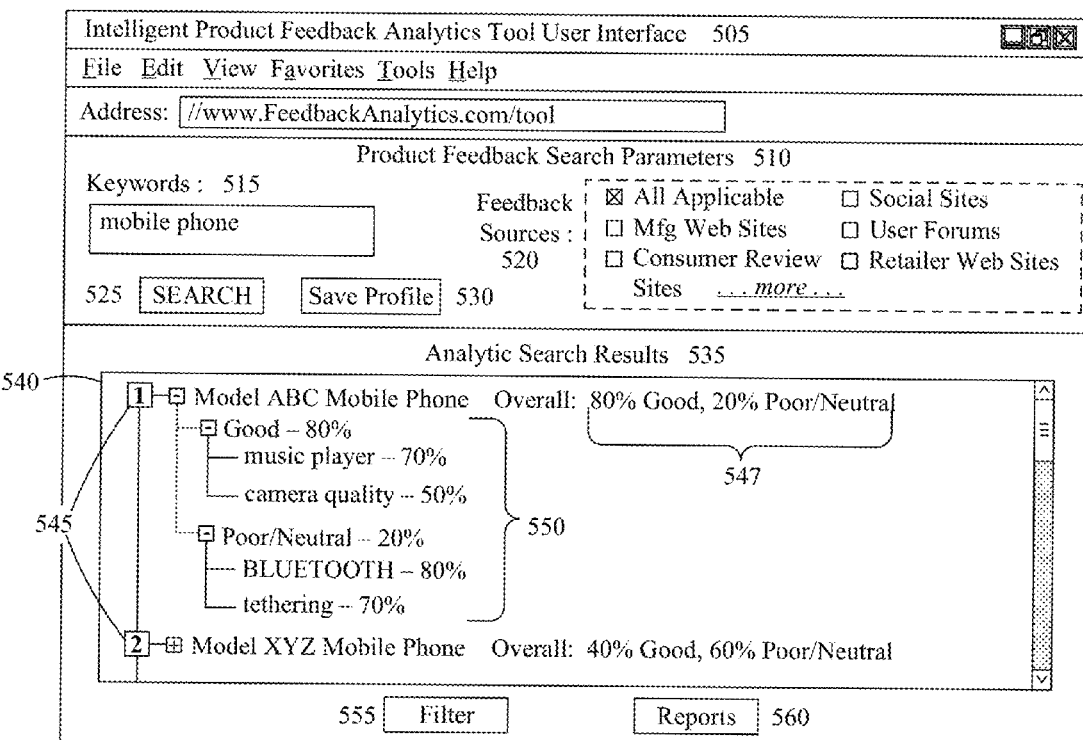
FIG. 5 is an illustration of an example user interface for the intelligent product feedback analytics tool in accordance with embodiments of the inventive arrangements disclosed herein.

FIG. 5 is an illustration of an example user interface 505 for the intelligent product feedback analytics tool in accordance with embodiments of the inventive arrangements disclosed herein. The intelligent feedback tool user interface 505 can be utilized within the context of system 100, process flow diagram 200, and/or methods 300 and 400.

As shown in this example, the intelligent feedback tool user interface 505 can be Web-based, utilizing a Web browser for presentation. Alternate embodiments can utilize different software application technologies compatible with the intelligent feedback tool and the supporting client device being used.

The intelligent feedback tool user interface 505 can be comprised of two main functional areas, one supporting the product feedback search parameters 510 and one supporting the analytic search results 535. The product feedback search parameters 510 section can contain a variety of user interface elements by which to collect product feedback search parameters.

The product feedback search parameters 510 section can include a text-box for keywords 515, options for selecting feedback sources 520, a search button 525, and a save profile button 530. The keywords 515 text-box can allow the user to enter text strings that represent the words or phrases to which the product feedback should relate or contain.

The feedback sources 520 area can be configured to allow the user to select product feedback data sources individually and/or by predefined groups. Selection of the search button 525 can cause the intelligent feedback tool to execute a search of product feedback data sources and/or its analytic search results library for entries matching the entered keywords 515 and/or selected feedback sources 520.

The save profile button 530 can present the user with the ability to save the current configuration of interface elements in the product feedback search parameters 510 section as a search profile. Depending upon the implementation of the intelligent feedback tool user interface 505, the save profile button 530 can open a secondary window to allow the user to configure values to be stored in the search profile.

In another embodiment, the product feedback search parameters 510 section of the intelligent feedback tool user interface 505 can include an interface element to allow a user to select a stored search profile for use with a new set of keywords 515.

The analytic search results 535 section of the intelligent feedback tool user interface 505 can have a display area 540 in which the product feedback search results 545 corresponding to the values entered in the product feedback search parameters 510 section. The product feedback search results 545 can be presented in various ways, such as the tree structure shown in this example. The overall product ratings 547 synthesized by the intelligent feedback tool from all the applicable product feedback data can be presented with each product feedback search result 545. Expanding the tree for a product feedback search result 545 can display the associated analytic parameters 550 identified from the product feedback data.

The analytic search results 535 section can also include a filter button 555 and a reports button 560. These buttons 555 and 560 can be used to access filtering and report options, respectively. Filtering options can allow the user to remove product feedback search results 545 from the display are 540 that do or do not match selected filter criteria, as is common functionality for many search engines.

Report options can allow the user to select reporting parameters or premade report formats in which to view the product feedback search results 545. For example, a premade report may present the rating 547 values of the product feedback search results 545 as pie charts, allowing the user to visually compare ratings 547 without reading through all the product feedback search results 545.

Additional functionality and access to the source data can be provided using context menus, floating windows, and/or other methods supported by the intelligent feedback tool user interface 505.

The benefit of the intelligent feedback tool regarding the information provided to the user via the analytic parameters 550 of the product feedback search results 545 can be illustrated by explaining the contents shown in this example. In the product feedback search parameters 510 section, the user has defined a search to be performed using the keywords 515 "mobile phone" and "all applicable" feedback sources 520.

The display area 540 of the analytic search results 535 section can present the corresponding product feedback search results 545 and analytic parameters 550. Shown in the display area 540 are two product feedback search results 545; one for the Model ABC mobile phone and one for the Model XYZ mobile phone.

Looking at just the overall ratings 547 of these two mobile phone product feedback search results 545, one can be lead to think that the Model ABC mobile phone is best, since it has an 80% rating 547 as good. By expanding the tree for the Model ABC mobile phone, the analytic parameters 550 grouped by rating 547 can be displayed.

Now, the good and poor/neutral ratings 547 can have an associated context. Of all the product feedback that gave a "good" rating 547 to the Model ABC mobile phone, 70% was based on the music player functionality and 50% pertained to the camera quality. Thus, the Model ABC mobile phone is a rather good choice if music player and/or camera functionality is highly-valued.

The analytic parameters 550 for the "poor/neutral" rating 547 can indicate that 80% of the unsatisfactory ratings were made based on BLUETOOTH functionality and 70% pertained to tethering. Therefore, a user looking for a mobile phone to use with their automobile's BLUETOOTH system would most likely be dissatisfied with the Model ABC mobile phone.

In another embodiment, the analytic parameters 550 can encompass multiple levels of granularity.

It is important to note that the intelligent feedback tool user interface 505 shown in this example can be designed for a typical consumer. The intelligent feedback tool can utilize a different intelligent feedback tool user interface 505 to support the necessary features for a commercial user (i.e., retailer or manufacturer).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for improving the usability of product feedback data comprising:

receiving of a plurality of product feedback search parameters by an intelligent product feedback analytics tool, wherein said plurality of product feedback search parameters pertain to at least one of a product and a group of products;

performing a search on plurality of product feedback data sources using the product feedback search parameters to gather product feedback;

obtaining a plurality of product feedback search results applicable to the plurality of product feedback search parameters, wherein each product feedback search result comprises at least one of a rating value upon a rating scale and feedback content in a textual format;

for each product represented in the obtained plurality of product feedback search results, synthesizing a composite rating value for each rating category of the rating scale defined for the intelligent product feedback analytics tool from rating values contained in product feedback search results that are applicable to the product, wherein the synthesizing comprises:

converting the rating value for each product feedback search result to an equivalent rating value with respect to the rating scale defined for the intelligent product feedback analytics tool;

assigning each product feedback search result to a rating category of the rating scale defined for the intelligent product feedback analytics tool, wherein the converted rating value of a product feedback search result falls within a rating value range defined for the rating category to which it is assigned; and expressing a quantity of product feedback search results assigned to each rating category as a percentage of a total quantity of product feedback search results that are applicable to the product;

for each product represented in the obtained plurality of product feedback search results, analyzing the plurality of product feedback search results for at least one analytic parameter, wherein each analytic parameter represents a commonality among a subset of the product feedback search results that are applicable to the product, wherein said analysis utilizes natural language processing techniques; and presenting the plurality of product feedback search results, composite rating values, and the at least one analytic parameter in an organized manner within a user interface, wherein the at least one analytic parameter presented provides a context for the corresponding composite rating value.

2. The method of claim 1, comprising:
querying an analytic search results library for entries matching the received plurality of product feedback search parameters, wherein the analytic search results library is a knowledgebase of product feedback search results previously processed by the intelligent product feedback analytics tool;
when matching entries are absent from the analytic search results library, requesting the plurality of product feedback search results for the plurality of product feedback search parameters from a content aggregator, wherein said content aggregator is capable of accessing data sources required by the intelligent product feedback analytics tool; and
receiving the plurality of product feedback search results from the content aggregator.

3. The method of claim 2, further comprising:
when matching entries are available from the analytic search results library, retrieving the matching entries from the analytic search results library;
determining if the matching entries satisfy all of the plurality of product feedback search parameters;
when the matching entries satisfy all of the plurality of product feedback search parameters, bypassing the requesting and receiving of the plurality of product feedback search results from the content aggregator; and
when at least one product feedback search parameter is unsatisfied by the matching entries, executing the requesting and receiving of product feedback search results from the content aggregator for only the at least one unsatisfied product feedback search parameter, wherein product feedback search results received from the content aggregator are combined with the matching entries retrieved from the analytic search results library.

4. The method of claim 3, wherein retrieving of the matching entries further comprises:
determining a likelihood that an originating source of a matching entry has changed;
when the likelihood indicates a high probability that the originating source has changed, discarding the matched entry; and
automatically executing the requesting and receiving of product feedback search results from the content aggregator to replace the discarded entry.

5. The method of claim 2, wherein prior to the querying of the analytic search results library, said method further comprises:
ascertaining an existence of a search profile for an originator of the plurality of product feedback search parameters, wherein the search profile is stored by the intelligent product feedback analytics tool; and
when the search profile exists for the originator, applying applicable contents of said search profile to the plurality of product feedback search parameters, wherein said application modifies a value of at least one product feedback search parameter.

6. The method of claim 1, further comprising:
receiving, via the user interface, a command to alter the presentation of the plurality of product feedback search results, associated composite rating values, and the at least one analytic parameter;
executing the received command upon the plurality of product feedback search results, wherein at least one of an organizational structure and contents of the plurality of product feedback search results is modified by the processing of the received command; and
presenting the plurality of product feedback search results as modified by the processing of the received command within the user interface.

7. The method of claim 1, further comprising:
obtaining a plurality of product feedback search results applicable to the plurality of product feedback search parameters in a non-textual format, wherein the product feedback search results in a non-textual format comprises at least one of audio, video and image; and
translating the product feedback search results into textual format to be processed by the intelligent product feedback analytics tool.

8. The method of claim 1, wherein the analyzing of the plurality of product feedback search results further comprises:
upon completion of the analysis of a product feedback search result, storing the analyzed product feedback search result in an analytic search results library, wherein the analytic search results library is a knowledgebase of product feedback search results previously processed by the intelligent product feedback analytics tool.

9. A computer program product comprising a non-transitory computer readable storage medium having computer usable program code embodied therewith, the computer usable program code comprising:
computer usable program code stored in the non-transitory storage medium configured to receive a plurality of product feedback search parameters, wherein said plurality of product feedback search parameters pertain to at least one of a product and a group of products;
computer usable program code stored in the non-transitory storage medium configured to perform a search on plurality of product feedback data sources using the product feedback search parameters to gather product feedback;
computer usable program code stored in the non-transitory storage medium configured to obtain a plurality of product feedback search results applicable to the plurality of product feedback search parameters, wherein each product feedback search result comprises at least one of a rating value upon a rating scale and feedback content in a textual format;
computer usable program code stored in the non-transitory storage medium configured to, for each product represented in the obtained plurality of product feedback search results, synthesize a composite rating value for each rating category of a predefined rating scale from rating values contained in product feedback search results that are applicable to the product, wherein the computer usable code to synthesize further comprises:
computer usable program code stored in the non-transitory storage medium configured to convert the rating value for each product feedback search result to an equivalent rating value with respect to the predefined rating scale;
computer usable program code stored in the non-transitory storage medium configured to assign each product feedback search result to a rating category of the predefined rating scale, wherein the converted rating value of a product feedback search result falls within a rating value range defined for the rating category to which it is assigned; and
computer usable program code stored in the non-transitory storage medium configured to express a quantity of product feedback search results assigned to each rating category as a percentage of a total quantity of product feedback search results that are applicable to the product;

computer usable program code stored in the non-transitory storage medium configured to, for each product represented in the obtained plurality of product feedback search results, analyze the plurality of product feedback search results for at least one analytic parameter, wherein each analytic parameter represents a commonality among a subset of the product feedback search results that are applicable to the product, wherein said analysis utilizes natural language processing techniques; and computer usable program code stored in the non-transitory storage medium configured to present the plurality of product feedback search results, composite rating values, and the at least one analytic parameter in an organized manner within a user interface, wherein the at least one analytic parameter presented provides a context for the corresponding composite rating value.

10. The computer program product of claim 9, wherein the obtaining of the plurality of product feedback search results further comprises:

computer usable program code stored in the non-transitory storage medium configured to query an analytic search results library for entries matching the received plurality of product feedback search parameters, wherein the analytic search results library is a knowledgebase of product feedback search results previously processed;

computer usable program code stored in the non-transitory storage medium configured to, when matching entries are absent from the analytic search results library, request the plurality of product feedback search results for the plurality of product feedback search parameters from a content aggregator, wherein said content aggregator is capable of accessing data sources required to generate the plurality of product feedback search results; and computer usable program code stored in the non-transitory storage medium configured to receive the plurality of product feedback search results from the content aggregator.

11. The computer program product of claim 10, further comprising:

computer usable program code stored in the non-transitory storage medium configured to, when matching entries are available from the analytic search results library, retrieve the matching entries from the analytic search results library;

computer usable program code stored in the non-transitory storage medium configured to determine if the matching entries satisfy all of the plurality of product feedback search parameters;

computer usable program code stored in the non-transitory storage medium configured to, when the matching entries satisfy all of the plurality of product feedback search parameters, bypass the request and receipt of the plurality of product feedback search results from the content aggregator; and computer usable program code stored in the non-transitory storage medium configured to, when at least one product feedback search parameter is unsatisfied by the matching entries, execute the request and receipt of product feedback search results from the content aggregator for only the at least one unsatisfied product feedback search parameter, wherein product feedback search results received from the content aggregator are combined with the matching entries retrieved from the analytic search results library.

12. The computer program product of claim 9, wherein the analyzing of the plurality of product feedback search results further comprises:

computer usable program code stored in the non-transitory storage medium configured to, upon completion of the analysis of a product feedback search result, store the analyzed product feedback search result in an analytic search results library, wherein the analytic search results library is a knowledgebase of product feedback search results previously processed.

13. A system method for improving the usability of product feedback data comprising:

one or more processors;

one or more non-transitory storage mediums;

program instructions stored within the non-transistor storage mediums, wherein the one or more processors execute the program instructions causing a machine to:

receive a plurality of product feedback search parameters by an intelligent product feedback analytics tool, wherein said plurality of product feedback search parameters pertain to at least one of a product and a group of products;

perform a search on plurality of product feedback data sources using the product feedback search parameters to gather product feedback;

obtain a plurality of product feedback search results applicable to the plurality of product feedback search parameters, wherein each product feedback search result comprises at least one of a rating value upon a rating scale and feedback content in a textual format;

for each product represented in the obtained plurality of product feedback search results, synthesize a composite rating value for each rating category of the rating scale defined for the intelligent product feedback analytics tool from rating values contained in product feedback search results that are applicable to the product, wherein synthesizing the composite rating comprises:

converting the rating value for each product feedback search result to an equivalent rating value with respect to the rating scale defined for the intelligent product feedback analytics tool;

assigning each product feedback search result to a rating category of the rating scale defined for the intelligent product feedback analytics tool, wherein the converted rating value of a product feedback search result falls within a rating value range defined for the rating category to which it is assigned; and expressing a quantity of product feedback search results assigned to each rating category as a percentage of a total quantity of product feedback search results that are applicable to the product;

for each product represented in the obtained plurality of product feedback search results, analyze the plurality of product feedback search results for at least one analytic parameter, wherein each analytic parameter represents a commonality among a subset of the product feedback search results that are applicable to the product, wherein said analysis utilizes natural language processing techniques; and present the plurality of product feedback search results, composite rating values, and the at least one analytic parameter in an organized manner within a user interface, wherein the at least one analytic parameter presented provides a context for the corresponding composite rating value.

14. The system of claim 13, wherein the one or more processors execute the program instructions further causing a machine to:
query an analytic search results library for entries matching the received plurality of product feedback search parameters, wherein the analytic search results library is a knowledgebase of product feedback search results previously processed by the intelligent product feedback analytics tool;
when matching entries are absent from the analytic search results library, request the plurality of product feedback search results for the plurality of product feedback search parameters from a content aggregator, wherein said content aggregator is capable of accessing data sources required by the intelligent product feedback analytics tool; and
receive the plurality of product feedback search results from the content aggregator.

15. The system of claim 14, wherein the one or more processors execute the program instructions further causing a machine to: prior to querying of the analytic search results library:
ascertain an existence of a search profile for an originator of the plurality of product feedback search parameters, wherein the search profile is stored by the intelligent product feedback analytics tool; and
when the search profile exists for the originator, apply applicable contents of said search profile to the plurality of product feedback search parameters, wherein said application modifies a value of at least one product feedback search parameter.

16. The system of claim 13, wherein the one or more processors execute the program instructions further causing a machine to:
when matching entries are available from the analytic search results library, retrieve the matching entries from the analytic search results library;
determine if the matching entries satisfy all of the plurality of product feedback search parameters;
when the matching entries satisfy all of the plurality of product feedback search parameters, bypass the requesting and receiving of the plurality of product feedback search results from the content aggregator; and
when at least one product feedback search parameter is unsatisfied by the matching entries, execute the requesting and receiving of product feedback search results from the content aggregator for only the at least one unsatisfied product feedback search parameter, wherein product feedback search results received from the content aggregator are combined with the matching entries retrieved from the analytic search results library.

17. The system of claim 16, wherein retrieving the matching entries further comprises:
determining a likelihood that an originating source of a matching entry has changed;
when the likelihood indicates a high probability that the originating source has changed, discarding the matched entry; and
automatically executing the requesting and receiving of product feedback search results from the content aggregator to replace the discarded entry.

18. The system of claim 13, wherein the one or more processors execute the program instructions further causing a machine to:
receive, via the user interface, a command to alter the presentation of the plurality of product feedback search results, associated composite rating values, and the at least one analytic parameter;
execute the received command upon the plurality of product feedback search results, wherein at least one of an organizational structure and contents of the plurality of product feedback search results is modified by the processing of the received command; and
present the plurality of product feedback search results as modified by the processing of the received command within the user interface.

19. The system of claim 13, wherein the one or more processors execute the program instructions further causing a machine to:
obtain a plurality of product feedback search results applicable to the plurality of product feedback search parameters in a non-textual format, wherein the product feedback search results in a non-textual format comprises at least one of audio, video and image; and
translate the product feedback search results into textual format to be processed by the intelligent product feedback analytics tool.

20. The system of claim 13, wherein the one or more processors execute the program instructions further causing a machine to: analyze of the plurality of product feedback search results by: upon completion of the analysis of a product feedback search result, storing the analyzed product feedback search result in an analytic search results library, wherein the analytic search results library is a knowledgebase of product feedback search results previously processed by the intelligent product feedback analytics tool.

* * * * *